Figure 1:
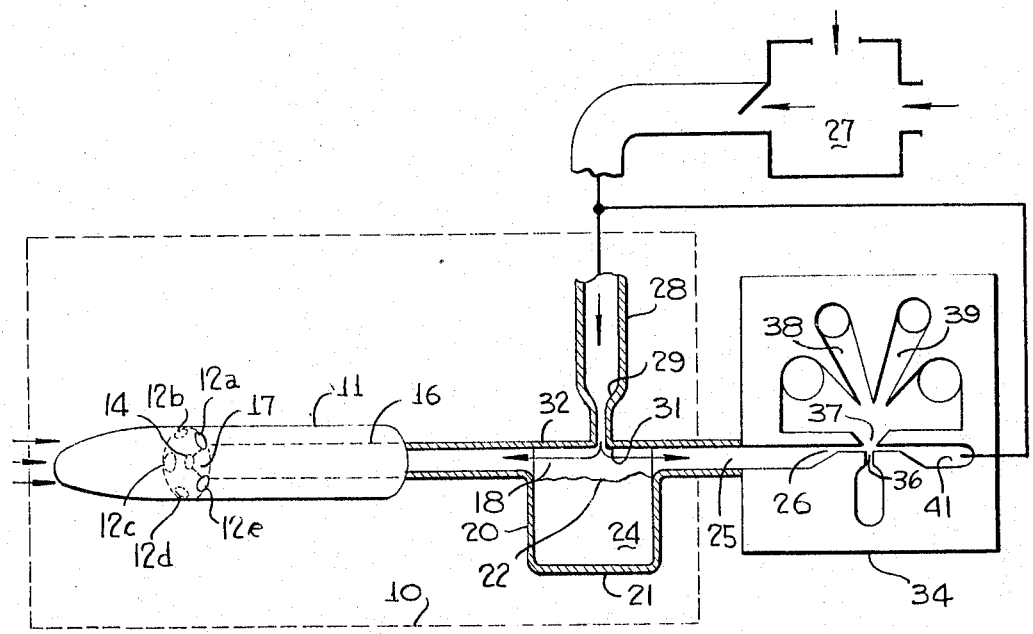

Aug. 2, 1966  R. E. BOWLES  3,263,501

PRESSURE SENSING AND MEASURING DEVICE

Filed Jan. 9, 1964

INVENTOR.
ROMALD E. BOWLES
BY

United States Patent Office 3,263,501
Patented August 2, 1966

3,263,501
PRESSURE SENSING AND MEASURING DEVICE
Romald E. Bowles, 12712 Meadowood Drive,
Silver Spring, Md.
Filed Jan. 9, 1964, Ser. No. 336,677
8 Claims. (Cl. 73—389)

This invention relates generally to a device for sensing and measuring the static pressure at a predetermined level in a fluid medium and, more specifically, to a fluid device for sensing and measuring the static pressure at a predetermined level in a fluid medium, the device attenuating undesired extremes in frequencies of pressure fluctuations.

Conventional devices that sense the static pressure at predetermined levels in a fluid medium environment are typically used to provide an indication as to the vertical position of an air or water craft moving in a fluid medium with respect to some reference axis or plane. Ordinarily, such devices include a probe attached to, and extending from the body of the water or air craft into contact with the fluid medium supporting the craft during movement, the probe sensing the static pressure of the fluid medium contacted. The fluctuations in static pressure which result from a change in the level of the craft relative to a preselected reference plane or level are measured usually by an electromechanical or electronic device which converts differentials in static pressures to mechanical movements or electrical signals corresponding to fluctuations in static pressure sensed. The mechanical movements or electrical signals may actuate or energize control devices which ultimately change the position of the craft to achieve the desired orientation of the craft relative to the preselected reference axis or plane.

Electro-mechanical systems for measuring the static pressure detected by the probe usually require numerous moving mechanical parts for the operation thereof and moving parts decrease the reliability of the entire sensing and measuring system and render the system susceptible to malfunctioning as a result of corrosion, friction, inertia, and thermal expansion of the parts. Electronic systems on the other hand suffer the disadvantages of being less rugged than electro-mechanical counter-parts and requiring constant output power sources.

Another disadvantage of prior art static pressure sensing and measuring systems is the requisite need to convert or translate from fluid pressures to mechanical movements or electrical signals. In addition, the means whereby the level of the craft is changed, in response to a pressure signal from the probe sensing static pressure, is oftentimes operated or controlled by fluid pressure or flow and thus a complete cyclic conversion from fluid energy to electrical or mechanical energy and then back to fluid energy has to be effected by the system.

For many applications therefore, it would be desirable to have a device for sensing differentials in static pressure caused by movement of an air or water craft through a fluid medium which comprises a minimum number of mechanical moving parts and no electronic circuitry. In addition, it would be desirable to obviate the need for converting or translating from fluid pressure signals received by the pressure sensor to mechanical movements or electrical signals for measuring static pressures sensed by the pressure sensor.

It is broadly an object of this invention to provide a static pressure sensing device which incorporates a minimum number of moving elements for its operation.

Another object of this invention is to provide a static pressure sensing device requiring a minimum number of moving parts for its operation, the device attenuating static pressure fluctuations of undesired frequency ranges and passing pressure fluctuations in the desired frequency range.

Still another object of this invention is to provide a static pressure sensing device which can be easily and inexpensively constructed to achieve the purposes set forth in the foregoing objects.

The static pressure sensor constructed in accordance with the instant invention comprises basically a tube or passage having a fluid resistance located at each end thereof through which fluid pressure signals pass. A fluid capacitance is connected to the tube between the resistances and the tube receives fluid inflow from a supply of pressurized fluid through a fluid inflow resistance, the supply discharging fluid into the fluid capacitance, as well. The fluid resistances located at each end of the tube, in combination with the fluid capacitance, provide a predetermined resistance-capacitance time delay to pressure build-up in the tube so that pressure fluctuations received by one of the ends of the tube having a frequency greater than some predetermined maximum are dampened out in the tube before issuing from the other end of the tube. The other end of the tube is connected to the control nozzle of a pure fluid amplifier so that pressure fluctuations in the desired frequency range are measured and amplified by the amplifier.

Figure 2:
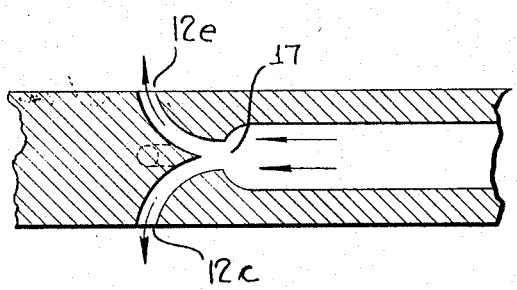

The above and still further objects, features and advantages of the present invention will become apparent upon consideration of the following detailed description of one specific embodiment thereof, especially when taken in conjunction with the accompanying drawings, wherein:

FIGURE 1 illustrates a partial sectional side view of the pressure sensor constructed in accordance with this invention and in addition illustrates the coupling of the output of the sensor to a control nozzle of a pure fluid amplifier; and FIGURE 2 is a sectional side view of the probe of the sensor taken along section line 2—2 of FIGURE 1.

Referring now to FIGURE 1 for a more complete understanding of the invention, a static pressure sensor 10 is shown delineated by dotted lines in that figure. The static pressure sensor 10 includes an elongated probe 11 which may be attached to a body (not shown) at a position where it is desired to sense and measure the static pressure of the medium supporting the body. The longitudinal axis of the probe 11 is positioned substantially parallel with respect to anticipated lines of medium flow as shown by the arrows in FIGURE 1.

The probe 11, FIGURES 1 and 2, is provided with a series of ports referred to by the numerals 12a, 12b, 12c, 12d and 12e, the ports being spaced at predetermined intervals around the periphery of the probe so that the ports sense the average of static pressures of the medium around the probe 11 at any instant of time. The axes of the ports 12a, 12b, 12c, 12d and 12e, inclusive, are essentially perpendicular to the longitudinal axis of the probe 11 so that dynamic fluid pressures are not received and sensed by the ports. The ports are joined by a manifold 14 which is connected to one end of a tube 16. This end of the tube 16 is provided with a fluid resistance or constriction 17 for restricting flow from and into the manifold 14. The fluid resistance 17 may take the form of a porous plug, or the orifices of the ports 12a, 12b, 12c, 12d and 12e, if of smaller cross sectional area than that of the tube 16, may be alternatively utilized as fluid resistances for this end of the tube. The tube 16 receives pressurized fluid from the upper chamber 18 of a fluid capacitance 20.

The term "fluid capacitance" as used herein may be defined as that class of fluid energy storage means that store the energy of fluid as potential energy, and in general the energy stored in a fluid capacitance increases as the quantity of fluid received increases. A fluid capacitance may take one or more of the following exemplary forms: compression of a fluid to a greater density, change of thermodynamic state of a fluid, change of elevation of a fluid, change of fluid internal energy level, compression of one fluid by another fluid separated from the one fluid by a flexible diaphragm or wall, compression of a second fluid in direct contact with a first fluid, deformation of elastic or flexible walls which restrain the fluid, or change of elevation of a mass supported by the fluid.

The term "fluid" as used herein includes compressible as well as incompressible fluids, fluid mixtures and fluid combinations such as air and water. When compressible fluids are used a fluid capacitance chamber need not be resilient or expandable but may be made rigidly or inflexible. If the fluid is incompressible then the fluid capacitance should be elastically deformable or should have a free surface. Typical fluid capacitances are provided by pressure loaded flexible diaphragms which separate two fluids of different compressibility and elastically deformable tanks or containers.

Assuming for the purpose of explanation that the fluid employed in the sensor 10 is incompressible, for example water, and that the capacitance 20 includes a cylindrical casing 21 and a circular flexible diaphragm 22 for allowing variations in the volume of the upper chamber 18 resulting from increases and decreases in water pressure in the tube 16. The peripheral edges of the diaphragm are sealed to the inner walls of the casing 21 so that fluid in the upper chamber 18 is kept separated from fluid in the lower chamber 24 of the casing 21. The fluids on either side of the diaphragm 20 should have different compressibilities, the fluid having greater compressibility being contained by the lower chamber 24. Assuming that water is to be used as the working fluid in the unit 10, a compressible fluid such as air may be used in the lower chamber 24. The position of the diaphragm 22 and the volume of the chamber 18 will vary in accordance with a variation in pressure against the opposite faces of the diaphragm, the volume of the chamber 18 being governed by the flexibility of the diaphragm 22 and the relative pressures applied against the faces of the diaphragm by the fluids in each chamber, as will be evident to those working in the art.

If the water pressure in the upper chamber 18 increases, the diaphragm 22 will expand downwardly into the lower chamber 24 compressing the air into a smaller volume and thereby increasing the volume and capacitance of the upper chamber 18. Conversely, a reduction in water pressure in the upper chamber 18 will cause an upward deflection of the diaphragm 22 by expansion of the air in the lower chamber 24, thereby decreasing the volume of the upper chamber 18. The greater the flexibility of the diaphragm 22 the slower the change in capacitance, and vice versa.

An outflow tube 25 extends from an opening in the casing 21 to receive fluid from the upper chamber 18 of the fluid capacitance 20 and is preferably formed with a nozzle 26 at the downstream tube end, the nozzle 26 providing a resistance to fluid flow from the tube 25.

The tubes 16 and 25 and the upper chamber 18 receive fluid from a supply 27 which is maintained at a predetermined constant reference pressure; fluid being supplied by means of a tube 28 and a nozzle 29. The end of the nozzle 29 is admitted into an opening 31 formed in circular end wall 32 of the capacitance 20, the nozzle serving as a resistance to flow from the tube 28.

Since fluctuations in pressure received by the tube 25 are ordinarily of relatively small amplitude, it is advantageous, in general, to pressure amplify the fluctuations. In addition some means must be provided for measuring the amplitudes of the pressure fluctuations so that a measurement may be obtained as to the amplitude of incremental static pressure increases or decreases. The functions of pressure signal amplification and measurement may be performed by a pure fluid amplifier 34 wherein the nozzle 26 forms one control nozzle of the amplifier 34.

The pure fluid amplifier 34 illustrated in the drawing is a typical pure fluid linear pressure amplifier, such as disclosed in U.S. Patent No. 3,024,805. The amplifier 34 includes a power nozzle 36 for issuing a power stream into an interaction chamber 37 where the power stream can be displaced relative to output passages 38 and 39 as a result of control streams issuing from the nozzle 26 and an opposed control nozzle 41. Fluid issuing from the nozzle 26 is opposed by fluid issuing from the nozzle 41, the latter nozzle receiving fluid at preferably some constant reference pressure from the supply source 27 or from another manually adjusted constant pressure supply source (not shown) to serve as a bias or reference signal. The pressures of fluid issuing from the nozzle 26 are compared to the fluid pressure of reference level amplitude issuing from the nozzle 41. The differentials between the two pressures at any instant are amplified by the amplified displacement of the power stream issuing from the power nozzle 36 relative to the output passages 38 and 39.

Assuming for the purpose of explaining the operation of the amplifier 34 that the power stream initially divides equally into each output passage 38 and 39 to produce a null output differential fluid signal, if the fluid issuing from the nozzle 26 becomes instantaneously greater than the reference fluid pressure in the control nozzle 41, as a result of the ports 12a–12e sensing increased static pressure, the power stream will be displaced from the null state such that a greater quantity of power stream flow is received by the output passage 39 than is received by the output passage 38. Thus an increase of the fluid signal from the passage 39 may be considered as positive with respect to the null or equilibrium state. The differential in pressure between the output passage will be an amplified function of the differentials in pressure instantaneously occurring between opposing streams issuing from the nozzles 26 and 41. Conversely, if the amplitude of the pressure signal issuing from the nozzle 26 is less than that in nozzle 41 as a result of ports 12a–12e sensing a decrease in static pressure the output passage 38 will receive a greater proportion of the displaced power stream than is received by the passage 39. An increase of the fluid signal issuing from the output passage 39 may be considered as negative with respect to the null state.

Thus the fluctuations in pressure received by the nozzle 26 are amplified and compared to a predetermined pressure standard; variations above and below the standard appearing as positive and negative pressure signals respectively, in the output passages.

The output signals issuing from the amplifier 34 may be utilized directly to control the depth of a hydrofoil (not shown) to which the sensor 10 is affixed, as disclosed in my copending patent application Serial No. 316,000, filed October 14, 1963 and entitled Fluid Control Systems for Hydrofoils now U.S. Patent No. 3,209,714.

The resistances 17 and 26 formed at the ends of the tubes 16 and 25, respectively and the resistance offered to flow by the nozzle 29 cooperate to permit the development of a region of relatively high pressure defined between these resistances and including the upper chamber 18 thereby providing a capability of continuous outflow from the ports 12a–12e, inclusive and from the nozzle 26, even though the ports and the nozzle 26 are heavily backloaded. Thus, even if relatively large static pressures are received by the ports 12a–12e inclusive, flow will continue to egress from these ports preventing the ingress of flow from the fluid medium into the sensor 10. Ordinarily, continuous sensing outflow is desirable in order to prevent the introduction of extraneous material into the sensor from an impure fluid medium. Fluctuations in back pressure produced in the tube 16 are a function of the magnitude of instantaneous static pressures sensed by back loading and thereby restricting the outflow from ports 12a–12e, inclusive, the back pressure in the tube 16 increasing as the static pressure sensed by the probe 11 increases, and decreasing as the static pressure sensed by the probe 11 decreases.

The resistances provided by constrictions 17 and 26 acting together and in conjunction with the capacitance of the fluid capacitance 20 create a resistance-capacitance time constant for the sensor 10 which may be of any desired value, as a matter of choice. This feature is of primary importance when it is not intended that the sensor issue high frequency pressure signals from the nozzle 26. High frequency pressure variations may, for example, be produced by a choppy seaway in which the probe 11 is moving, or by minor high frequency perturbations in pressure of the fluid medium surrounding the sensing ports of the probe 11. Since the pressure build-up in the tube 16 is dependent upon the resistance-capacitance time constant of the sensor 10, the sensor can be designed so as to attenuate or dampen out undesired high frequency pressure fluctuations or variaitons received by the tube 16 and the capacitance 20 before these pressure signals or fluctuations are delivered as a control signal by the nozzle 26. Oftentimes, high frequency fluid pressure signal attenuation characteristics may be easily modified by increasing or decreasing the flexibility of the diaphragm 22, since as mentioned hereinabove, the capacitance of the fluid capacitance 20 increases as diaphragm flexibility increases, and decreases as diaphragm flexiblity decreases.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for sensing the static pressure in a fluid medium comprising: fluid conveying means having ends through which fluid pressure signals travel; a fluid resistance in each end of said conveying means for restricting the flow of fluid therethrough, a fluid capacitance communicating with said conveying means for receiving fluid from, and for discharging fluid into said conveying means as the pressure in said conveying means respectively increases and decreases, fluid supply means connected to said conveying means for discharging fluid at a predetermined pressure into said conveying means, and a fluid resistance in said supply means for restricting flow from said supply means to said conveying mean, the combination of fluid resistances in each end of said conveying means and said fluid capacitance providing a time constant for the conveying means such that pressure fluctuations of predetermined frequencies sensed by one end of said conveying means are attenuated in amplitude before issuing from the other end of said conveying means.

2. The system as claimed in claim 1 wherein said fluid capacitance includes a resilient member movable in response to increasing and decreasing pressures for varying the capacity of said fluid capacitance.

3. A fluid system for sensing the static pressure in a fluid medium comprising fluid conveying means having ends from which fluid in said means egresses therefrom, a fluid resistance in each end for restricting flow therethrough, an opening formed in said means, a fluid capacitance communicating with said opening and receiving fluid from and discharging fluid into said conveying means in response to variations in pressure in said conveying means, fluid supply means connected to said conveying means proximate said opening for discharging fluid into said conveying means, and a fluid resistance in said supply means proximate the connection with said conveying means for restricting flow therethrough, one end of said conveying means sensing the variations in static pressure in the fluid medium, the combination of the fluid resistance in each end and said fluid capacitance providing a time constant to said conveying means such that pressure fluctuations of predetermined frequencies sensed by said one end are damped out before egressing from the other end of said conveying means.

4. A fluid system for sensing the static pressure at various levels in a medium comprising a tube for conveying fluid pressures and including a pair of fluid egress ends for issuing fluid pressure signals, a plurality of fluid egress ports spaced around the periphery of the tube adjacent one egress end thereof, said ports sensing static pressure fluctuations created by the medium backloading said ports, fluid resistances formed in the tube ends for restricting the flow of fluid therefrom, an opening formed in said tube intermediate the ends thereof, a fluid capacitance attached to said tube and communicating with said opening for receiving fluctuations in fluid pressure in said tube, means located proximate said opening for supplying fluid at a predetermined pressure to said tube and capacitance, and a fluid resistance in said last mentioned means for restricting the flow into said tube, the combination of fluid resistances and said fluid capacitance providing a region of static pressure in said tube higher than that sensed by said ports, said fluid resistances in the ends of said tube and said capacitance providing a time constant for said tube such that pressure fluctuations of a predetermined frequency range sensed by said ports are dampened out before issuing from the other end of said pair of ends.

5. The system as claimed in claim 4 wherein a utilization device is connected to said other end of said pair and actuated by fluid pressure signals issuing from said other end.

6. The system as claimed in claim 4 wherein said fluid capacitance comprises a tank for receiving fluid, a flexible diaphragm having the periphery thereof sealed to the inner walls of said tank for dividing the tank into two pressure chambers, one chamber receiving pressure fluctuations from pressure fluctuations in said tube, and a fluid encapsulated in the other chamber compressible by diaphragm expansion.

7. A fluid system for sensing the static pressure at various levels in a fluid medium comprising, a tube for conveying fluid pressure signals and including a pair of fluid egress ends, a probe mounted to one of said egress ends and having a plurality of egress ports spaced around the periphery thereof, said egress ports communicating with the one end of said tube, the fluid flow from said ports and the back pressure in said tube being a function of the static pressure of the medium surrounding the probe periphery, a first fluid resistance in said one end upstream of said ports for restricting flow from said one end, a second fluid resistance in the other end of said tube for restricting flow therefrom, utilization means connected to receive fluid pressure signals issuing from said other end and actuated by fluctuations in pressure of the fluid signals so received, and openings formed transversely in said tube between the ends thereof, a fluid capacitance attached to said tube and communicating with said opening so as to receive and discharge fluid from and into said tube in accordance with the fluctuations in pressure in said tube, a second opening formed in said tube opposite said first opening, means for supplying fluid at a predetermined pressure to said second opening and a third fluid resistance located upstream of said second opening for restricting flow from said last mentioned means, the combination of the fluid resistances providing a region of higher pressure than that of the static pressure of the medium sensed, said first and second fluid resistances and said fluid capacitance providing a time constant to the system such that pressure fluctuations of predetermined frequencies are dampened out in said tube before issuing as pressure signals from said other end of said tube.

8. A system for sensing and measuring static pressure at various levels in a fluid medium comprising, a pure fluid amplifier including a power nozzle for issuing a defined power stream, output means positioned to receive quantities of power stream flow, a pair of control nozzles angularly positioned with respect to said power nozzle and issuing control streams for effecting amplified directional displacement of the power stream relative to said output means, fluid conveying means having first and second ends through which fluid flows, said first end coupled to one control nozzle of said pair for supplying fluid pressure signals thereto, the second end of said fluid conveying means positioned to sense static pressures of the medium, a source of predetermined pressure connected to the other control nozzle of said pair, means for restricting flow from said first and second ends, a fluid capacitance communicating with said conveying means for receiving fluid from and for discharging fluid into said conveying means as the pressure in said conveying means respectively increases and decreases, fluid supply means connected to said conveying means for discharging fluid at a predetermined pressure into said conveying means, the combination of said means for restricting flow from said first and second ends and said fluid capacitance providing a time constant for said conveying means such that pressure fluctuations of at least some predetermined frequency sensed by said other end of said conveying means are dampened out before issuing as a pressure signal from said one control nozzle.

References Cited by the Examiner
UNITED STATES PATENTS 3,153,934   10/1964   Reilly _____ 73—388

LOUIS R. PRINCE, *Primary Examiner.*